Figure 1:
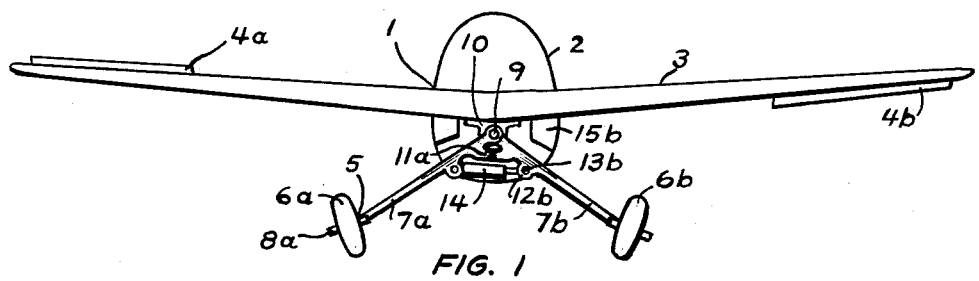

July 3, 1962   R. P. HOLLAND, JR   3,042,345
CONTROL-AUGMENTING LANDING GEAR
Filed Aug. 5, 1957   6 Sheets-Sheet 1

Raymond Prunty Holland, Jr.

Raymond Prunty Holland, Jr.

July 3, 1962   R. P. HOLLAND, JR   3,042,345
CONTROL-AUGMENTING LANDING GEAR
Filed Aug. 5, 1957   6 Sheets-Sheet 4

Raymond Prunty Holland, Jr.

July 3, 1962     R. P. HOLLAND, JR     3,042,345
CONTROL-AUGMENTING LANDING GEAR Filed Aug. 5, 1957     6 Sheets-Sheet 6

Raymond Prunty Holland, Jr.

United States Patent Office 3,042,345
Patented July 3, 1962

3,042,345
CONTROL-AUGMENTING LANDING GEAR
Raymond Prunty Holland, Jr., 204 W. College Blvd.,
Roswell, N. Mex.
Filed Aug. 5, 1957, Ser. No. 676,056
6 Claims. (Cl. 244—104)

This invention relates to means for improving aircraft control during landing and take-off and for reducing the structural loads to which landing gears are subjected.

Objects of this invention include the following:

To prevent downwind and downslope skidding of aircraft.

To improve the handling characteristics of aircraft in the partially airborne condition by making them more responsive to the flight controls at that time.

To provide an improved and novel type of cross wind landing gear for aircraft which permits the operation of the aircraft at all times by natural piloting techniques.

To improve the handling qualities of aircraft during taxying, landing and take-off; to produce smoothly continuous control responses at all times, even in strong and gusty cross winds; to improve the ground-borne stability and control when the aircraft is heavy on its gear and improve the airborne control when the aircraft is light on its gear, and to overlap these two phases without conflict.

To enable an aircraft to be controlled easily along a curved path during take-off and landing, to be able to avoid ground obstacles easily.

To provide a landing gear which permits the aircraft to be controlled in pitch and roll with minimum restraint from the landing gear whenever the ground bearing pressure is light enough to permit skidding, and which levels the aircraft relative to the ground surface when there is sufficient weight bearing down on the ground to prevent skidding.

To provide a landing gear which is suitable for aircraft which take-off heavily loaded and land lightly loaded, sufficiently stiff for the heavily loaded condition and not too stiff for the lightly loaded condition.

To reduce structural design loads in landings; to provide a non-jolting initial impact without impairing the ability to avoid peak design loads; to reduce runway pavement stresses; to save weight in the landing gear and in the aircraft; to equalize the loads on the various landing gear legs, to reduce the loads resulting directly and indirectly from wheel spin-up.

To give the aircraft designer increased freedom in the selection of the horizontal distance from the center of gravity at which he may locate any landing gear contact point, and in the number of such contact points he may employ.

To produce a landing gear for a vertically-rising aircraft which supports the landed aircraft in an attitude closer to the horizontal than the terrain on which it rests.

To permit vertically-rising aircraft and aircraft operating from single strip runways to operate independently of conditions of wind, ground slope and surface irregularities, thereby increasing their practical versatility.

To produce a rough field undercarriage for aircraft which does not transmit pitching and rolling irregularities of the terrain to the aircraft when it is taxying partially airborne.

Still other objects of the invention will be apparent from the context of this specification.

Figure 6:
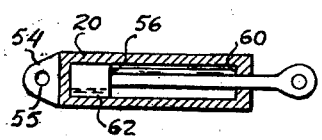
Figure 7:
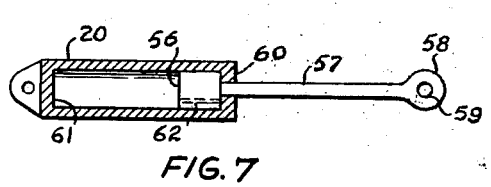
Figure 10:
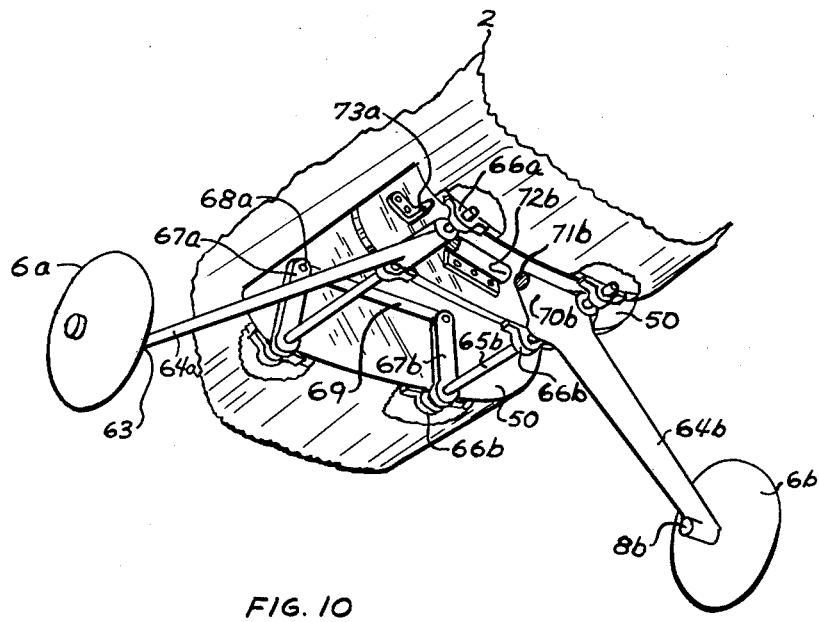
Figure 11:
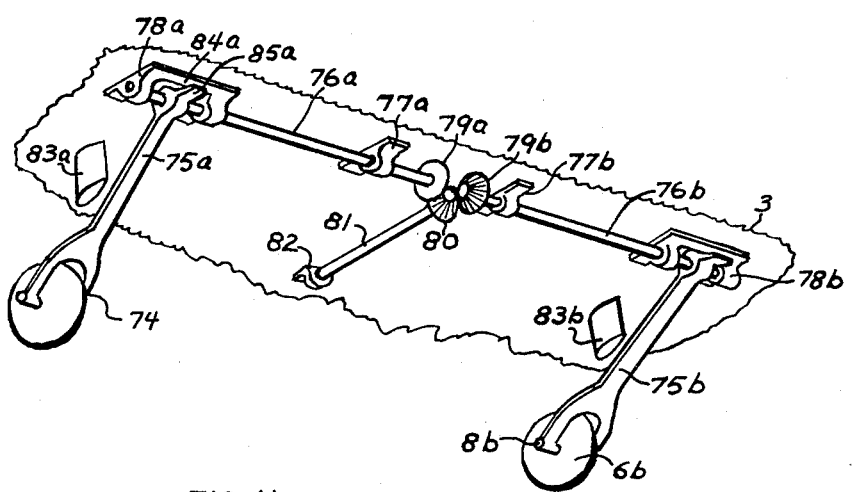
Figure 12:
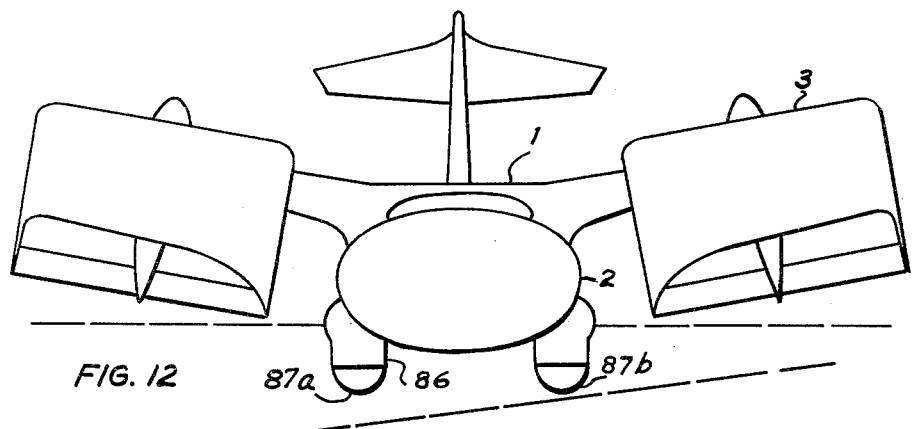
Figure 13:
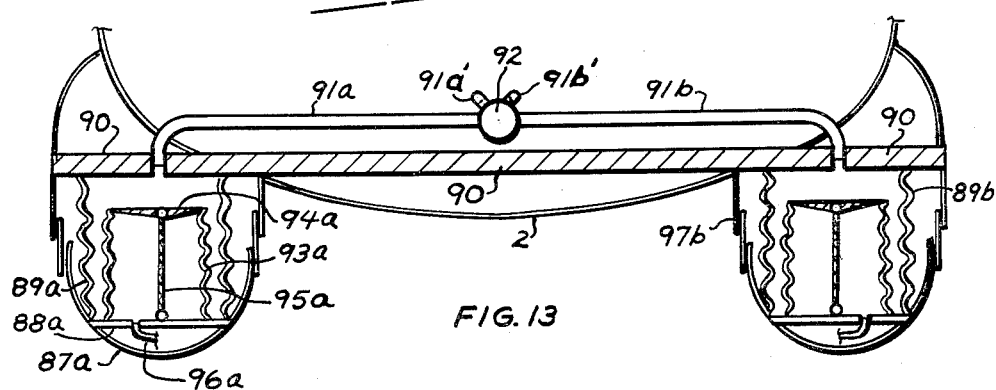
Figure 14:
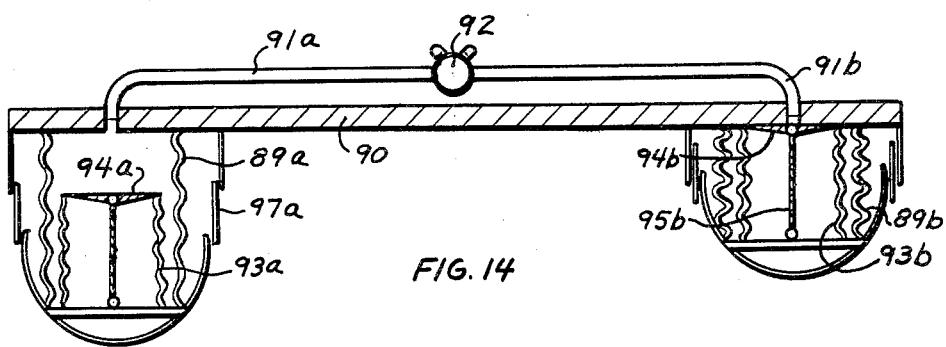
Figure 15:
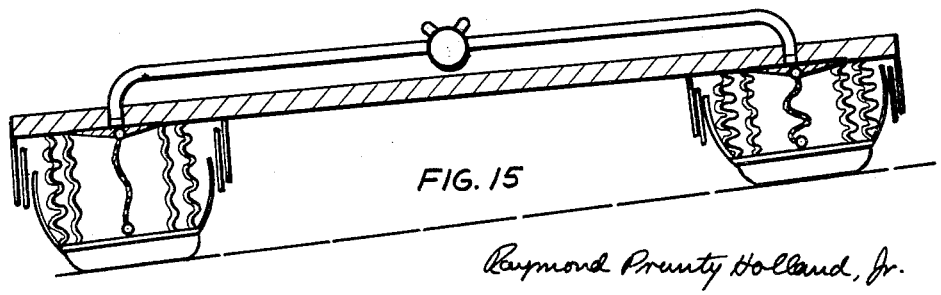
Figure 16:
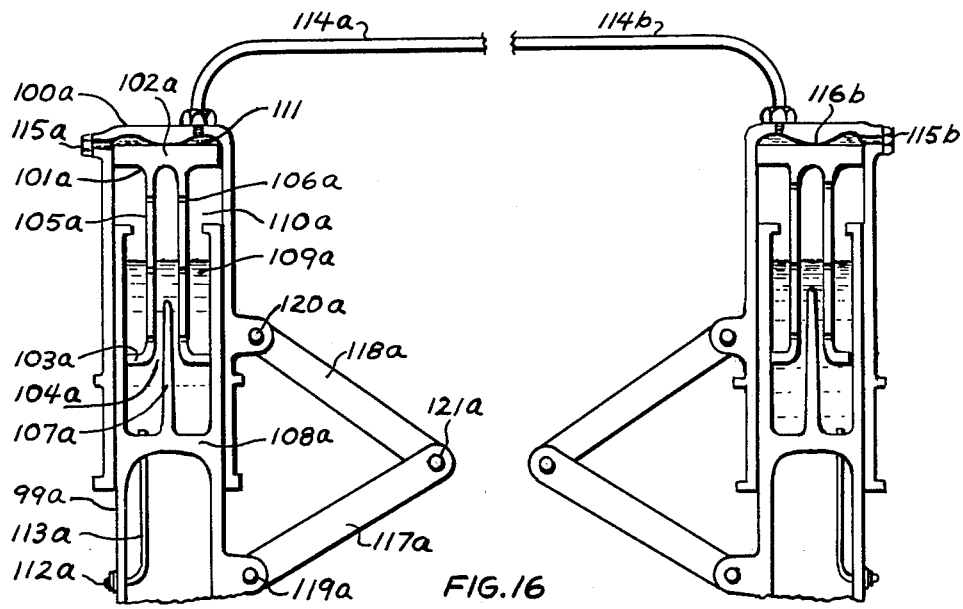
Figure 17:
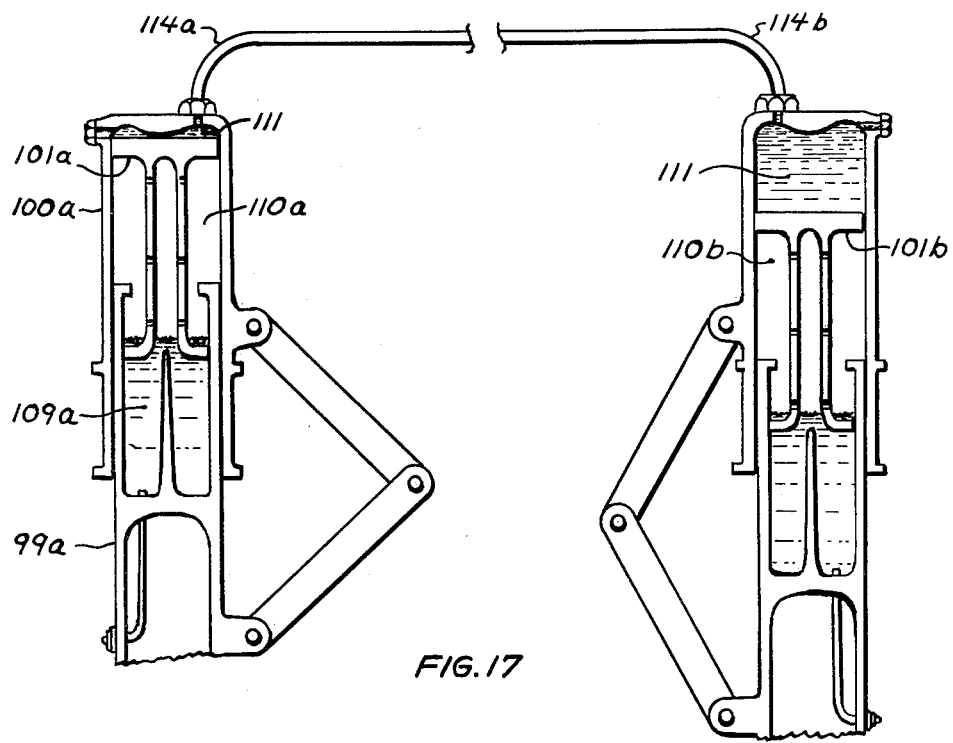
Figure 19:
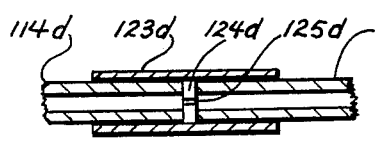
Figure 18:
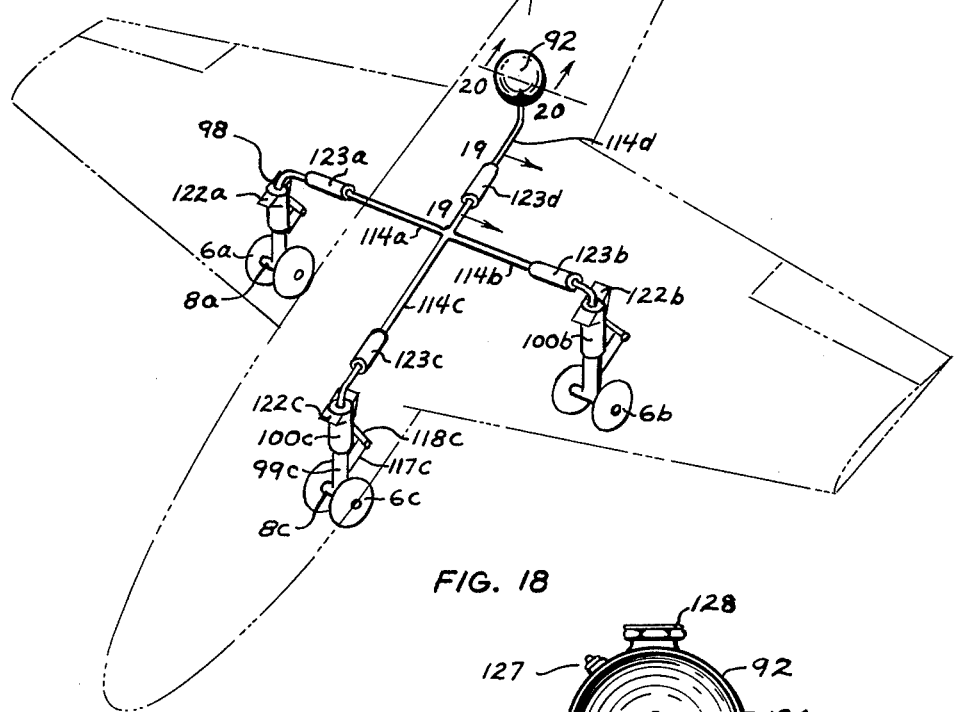
Figure 20:
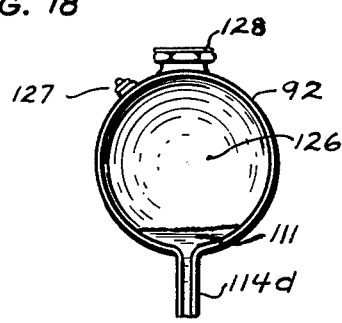

Referring now to the drawings, FIGURE 1 shows a transverse section on a vertical plane through an airplane employing this invention. The view is taken just forward of the landing gear looking rearwardly. FIGURES 2 through 5 are partial sections similarly located on other airplanes having wings and ailerons (not shown) employing variations of the invention. The landing gears in FIGURES 1 through 5 are typical of applications of the invention to two-leg non-retractable fuselage-mounted main landing gears on light airplanes. FIGURES 6 and 7 show a damping strut in cross section. FIGURES 8 and 9 illustrate the operation of the invention using the landing gear of FIGURE 1 as an example. This operation is basically the same for all forms of the invention. It applies to runway aircraft, to vertically-rising aircraft, to conditions of cross wind and to conditions of sloping terrain. FIGURE 10 is an oblique fragmentary view from below showing the invention applied to a fuselage-mounted main gear having pre-loaded torque rods in its springing system. FIGURE 11 is also an oblique fragmentary view from below showing a wing-mounted torque rod version. FIGURES 12 through 15 show the application of a pneumatic form of the invention to a vertically-rising aircraft. In FIGURE 12 this aircraft is seen head-on, alighting on a sloping surface. FIGURES 13 through 15 are taken at transverse sections on vertical planes through the landing blisters in various stages of landing. FIGURES 16 and 17 show vertical sections through a pair of telescoping shock absorber struts interconnected by a fluid transfer line. This construction is typical of the invention when applied to hydraulic landing gear mechanism. FIGURE 18 is an oblique view from above showing a landing gear using these telescoping struts, and applying the invention to aircraft rotations in the pitching sense in addition to the rolling sense. FIGURE 19 is a longitudinal cross-section through an orifice plate for purposes of damping the rolling and pitching motions of the aircraft relative to its landing gear, located in the interconnecting fluid transfer line of this landing gear, and FIGURE 20 is a vertical section through a pressurized air reservoir serving as a pre-loaded spring exerting static pressure equally on all three landing gear legs.

The invention recognizes that the significant action of a landing gear is not just the action of a single leg but consists of the integrated total of all the interactions of all the legs upon the aircraft. The aircraft with its total landing gear is a single system which must be made to produce the desired responses. Toward this end, in this invention, use is made of a landing gear which has "free-flight" characteristics, in the sense that during the time when the aircraft is nearly airborne and is in static equilibrium on its landing gear the total of the ground reaction forces acting through the landing gear produces only temporary eccentricity on the aircraft and hence produces no appreciable impulse moment capable of overpowering the aerodynamic flight controls of the aircraft.

A cross wind produces a cross wind component of force on an aircraft. This must be cancelled out by an opposing component of force such as a friction force between wheels and runway or by a horizontal component of the lift force produced by tilting the lift force toward the oncoming crosswind. To produce this effect in a runway airplane the windward wing may be lowered and opposite rudder may be used to prevent turning. Thus when a plane lands heading straight down a runway in a cross wind with the windward wing held low, the windward leg of the main landing gear strikes the ground before the opposite leg. With the conventional landing gear a substantial rolling moment is produced by the eccentric ground reaction and continues to act until the wings come level with the ground surface. With this conventional landing gear, the wings are forced toward their level position, the strength of the lateral component of lift opposing the cross wind is reduced, and the use of full aileron throw may be inadequate to keep the aircraft on the runway. The pilot is unable to rely upon runway friction to avoid this condition, because friction forces are unavoidably weak whenever the plane is in light contact. To correct this condition it is necessary to reduce the moment-producing ability of ground contact pressures during this critical time just after making contact without reducing the total bearing pressure against the runway surface. Clearly, this can be accomplished only by equalization of load. Even though conventional landing gears permit some degree of spring-restrained freedom for lateral rolling, and even though the moments acting to roll an airplane toward a level position are rather small when the plane is in light ground contact, these moments may nevertheless be excessive compared to the moments which can be produced by the ailerons during some critical control conditions. When the wing is at a high angle of attack and aileron control is poor, and the landing gear is still light enough on the ground to permit skidding, the pilot is momentarily in a critical transition period having neither air control nor ground control. In extreme conditions no amount of piloting skill is sufficient; there may be sudden gusts, or changes of wind direction, or there may be ice on the runway. At such times it is necessary to have ample margins of control. Instead of being caught without any means of control, it becomes possible through this invention to employ all means of control effectively and without conflict, to use ground steering, brakes, and the most positive and powerful method of all, the banked wing.

During landing or take-off, whenever the lift force is large, the ground friction force is small, and vice-versa. When the lift is large it is clearly capable of controlling any situation, if it may be tilted laterally as required. On the other hand, when lift is small ground friction is adequate for all necessary control. In other words, when the weight carried by the landing gear is small, the gear must not appreciably resist the tilting of the lift force, but when the weight on the gear is large it may be made very stiff without impairing control. For the best results, to provide margins of control for gusts and other sudden disturbances, the landing gear is preferably made incapable of producing any persistent rolling or pitching moments until it bears on the ground with sufficient force to prevent skidding. Aerodynamic controls thus remain unimpeded down to wheel-rolling speeds sufficiently slow to eliminate all critical control conditions. Airborne control and groundborne control are made to overlap each other smoothly and progressively.

On conventional landing gears the undesirable wing-leveling moments may be made small by employing very soft springing. This has disadvantages which are well known to aircraft and landing gear designers: Long strokes are required, leading to extra size and weight, both in the landing gear and in the aircraft structural volume into which to retract the gear. The risks of upsetting or of dragging a wing tip are increased, and so on. These faults are not present in the landing gear of the present invention. It achieves both freedom and stiffness, each when needed.

A narrow tread might be used on a conventional landing gear to reduce the above-described wing-leveling action, but this too has several disadvantage: A narrow tread not only causes a greater risk of upsetting but it produces a greater ground reaction on the individual gear leg which first strikes the ground.

There is only one particular tread dimension for an aircraft of a given rolling moment of inertia, equal approximately to twice the rolling radius of gyration of the aircraft, which causes opposite halves of a main gear to be equally loaded; a narrower tread overloads the leg which strikes first and a wider tread overloads the leg which strikes last. A similar situation exists concerning fore-and-aft location of landing gear members. Due to conflicting requirements of practical design, conventional landing gear legs are only rarely located ideally from the dynamic structural standpoint. As a result each individual gear leg and the aircraft structure to which it attaches must be designed to carry a disproportionately large share of the total aircraft landing reaction. By the use of this invention, however, this dynamic inequality is alleviated. The designer may use either wide tread or narrow, eliminating the faults and obtaining the advantages of both types, achieving both control freedom and ground stability, each at its proper time.

In this invention these desirable results are achieved by some form of flexible interconnection of the landing contact extremities, having motion-reversing properties, that is, causing one extremity to descend when another rises. Simultaneous rising of both ground contacting extremities is resisted by a common spring member. When the ground reaction is small, as when the aircraft is almost airborne, this spring action forces the contact extremities downwardly together away from the restraint of interrupters fixed on the aircraft, and thereby frees the aircraft from ground-imposed lateral rolling moments and longitudinal pitching moments, thereby permitting the aircraft to respond to ailerons and elevators, much as if the aircraft were actually airborne. On the other hand, if the ground reaction is large so that the available friction forces from runway contact are adequate for steering and braking without skidding, the elasticity of the interconnection allows the interrupters to come into play and to eliminate these freedoms and enforce a comparatively stiff alignment with the plane on the ground. During light ground contact when the interrupters are not active the above-mentioned motion-reversing action occurs. Ground reaction forces are transmitted to the aircraft solely through some such medium as trapped fluid or a deflected spring, the elastic stress of which is used to actuate the necessary devices. For example, the pressure in an interconnected fluid system may act at all ground contact points. Since this fluid pressure is equal everywhere it presses equally at these points. Total vertical forces at each point, accordingly, are in proportion to the areas against which this common pressure acts, and these areas are designed in proportion to the vertical design static loads at each ground contact point. Consequently, except for transient effects such as internal pressure drops as trapped fluid moves through the system, friction between moving parts, and mass inertia reactions of parts which are relatively small, the forces at each contact point remain proportional to each other. The resultant vertical force from all contact points holds a nearly constant position, this position being located by design to pass close to the aircraft center of gravity. In brief, at this time the landing gear is incapable of applying any persistent moment to the aircraft or of maintaining appreciably higher relative stresses in one gear leg than in another. These results apply regardless of how many ground-contacting points the designer employs in the system or where he locates them. They may be arranged in multiple, spread out laterally and fore-and-aft. All landings resemble three-point landings in that all tires make ground contact in quick succession, even though the aircraft may be banked and nose-high relative to the ground surface. The dynamic inequalities due to eccentric landings are reduced because the aircraft is not forced to pitch or roll appreciably at this time, each local gear leg may be designed to lighter loads, and weight is saved in the gear leg and in the aircraft.

In conventional landing gears, the drag loads accompanying wheel spin-up are sometimes the greatest drag force to which the gear must be designed. In the present invention, at the designer's option, the individual initial wheel reaction bearing against the runway may be made much lighter than with conventional landing gears.

Then, the initial friction forces exerted by the runway to spin up the wheels are correspondingly smaller and the time span during which each wheel accelerates to full spinning speed is correspondingly greater. Consequently, wheel spin-up drag forces may be made smaller than on a conventional gear.

There are several stages in the operation of this landing gear which may be emphasized in various ways according to design needs. The "free-flight" stage, with which this discussion has been chiefly concerned, is typified by free rocking and load equalization. In contrast, there is also a "stable-base" stage with no rocking softness which occurs when taxying slowly and when standing.

In the "free-flight" stage the springing of any individual gear leg is relatively soft. With one leg moving vertically and the other legs stationary, the moving leg operates against springing which is common to all legs. For example, if there are four equal struts statically carrying four equal loads the deflection of one of these legs by itself will be four times as great as would be the movement of all four legs moving together, when as much energy is delivered to the common spring in one case as in the other.

When any one landing gear leg rises sufficiently to come into engagement with its interrupter the landing gear enters the "stable-base" phase of its operation and the individual static ground reactions no longer stay in proportion to each other. This is necessary because in any eccentric landing a greater load on one leg is required to commence the rotation of the aircraft which levels it relative to the runway.

The "stable-base" phase of the landing gear action becomes fully developed when all legs have shortened sufficiently to bring their interrupters into action. A relative rigidity to the ground is thereby produced which protects aircraft parts from ground contact, establishes a stiffly sprung contact for desirable ground vehicle characteristics, and reduces the ability of wind and other disturbances to rock the aircraft, attributes which the designer may emphasize to any required degree.

The stable-base and free-flight phases combine advantageously in numerous ways. A typical problem in landing gear design is that of the long range jet aircraft which takes off very heavily loaded with fuel at which time its conventional undercarriage is too soft for the load it carries, and which lands after burning the fuel at which time the undercarriage is too stiff for the light landing weight, jolting the occupants on touch-down. In the present invention this problem is solved. When heavily loaded, the taxying and early portion of the take-off run operate on the stable-base phase, which can carry the weight firmly. When landing light, the aircraft makes contact on the softer load-distributing phase which considerably reduces the probabilities of a jolting impact.

The operation of the invention will be understood from the drawings in which parts designated "a" are at the left of the drawing and indicate the presence of an equivalent part designated "b" at the right of the drawing. Parts designated "c" lie relatively forward on the aircraft and correspond to similar parts designated "d" which lie relatively rearward. In the descriptions these letter designations are employed only when the comparative positioning of the parts is significant.

FIGURES 1 through 5 show versions of the invention employing several arrangements of cantilever beam landing gear legs all of which act as springs in bending. In the static ground-standing condition, in all cases, these legs engage bearing pad interrupters so that in standing and slow taxying only the springing flexibilities in the individual legs and tires are active, and the landing gear is otherwise rigid to the aircraft. On the other hand when a sufficient portion of the weight of the aircraft is supported by the wings the legs depart from these interrupters, and the aircraft is free to hold a steadily banked position relative to its landing gear, from which position it may be readily controlled by the ailerons.

In FIGURE 1 airplane 1 having fuselage 2, wings 3 and ailerons 4a and 4b, conventionally operated, is equipped with undercarriage 5, with wheels 6a and 6b mounted at the lower extremities of sloping flexible cantilever legs 7a and 7b, on axles 8a and 8b. At their upper ends struts 7 pivot freely and independently on a common horizontal fore and aft pivot pin 9 through fitting 10 which is rigidly attached to the lower surface of wing 3. The travel of legs 7 toward each other around pivot 9 is stopped by the contact of stops 11a and 11b rigidly attached to legs 7a and 7b respectively. Lugs 12 rigidly attached to legs 7 carry pivot pins 13 (the axes of which are parallel to that of pin 9) to which are mounted conventional tension-spring-and-damping-strut 14, these parts governing the motions of legs 7 relative to each other around pivot pin 9. Strut 14 draws legs 7 toward each other extending wheels 6 downwardly beneath pivot 9 so far as this is permitted by stops 11. The motion of the group of parts including legs 7, strut 14 and wheels 6 around pivot 9 is unrestrained except as leg 7 comes in contact with interrupter 15 rigidly attached to fuselage 2 and wing 3.

When aircraft 1 is in light contact with the ground the entire weight reaction passes through pivot 9 where it is distributed equally to the two legs 7. Strut 14 exerts a balancing tension force acting in common on legs 7a and 7b; therefore the bending moments in legs 7 and the ground bearing pressures beneath tires 6 are equal on the two lateral sides of the aircraft. Yet there is no restraint against aileron control; aircraft 1 is free to pivot around pivot 9. As more weight settles onto the landing gear, strut 14 resists with an increasing spring force and it resists quick increases of length by conventional fluid damping shock absorbing action. The landing gear is designed so that only when sufficient steady ground pressure is exerted on wheels 6 to prevent skidding (at which time aileron control is no longer needed) will either of legs 7 bear against interrupters 15, introducing a steadily applied rolling moment leveling the fuselage and wing to the landing gear.

The motion-reversing feature is to be observed in FIGURE 1; wheel 6a is interconnected to wheel 6b such that the raising of one wheel lowers the other wheel, reversing the vertical components of motion of the two, when neither of legs 7 bears against interrupters 15. There is one spring member acting in common between the wheels forcing them downwardly, namely tension shock strut member 14. Also there is a spring member individually at each wheel acting between the wheel and the aircraft; this is the flexible action of leg 7, and it acts even when leg 7 is against interrupter 15.

Figure 2:
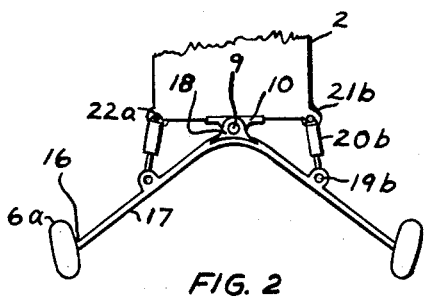

In FIGURE 2, landing gear 16 employs a continuous spring member 17 in common for both landing gear legs, in this way achieving a simple lever type of motion-reversing mechanism between wheels 6. Fitting 18 attached rigidly on spring 17 at its plane of symmetry attaches on pivot 9. Pivots 19 attach spring 17 to the lower ends of damping air-check struts 20, which attach at their upper ends to fixed lug 21 on fuselage 2, by means of pivot pin 22. Damping strut 20 has no mechanical spring action. It is a shock absorber and interrupter, containing stops preventing unlimited compression, and it also contains stops preventing unlimited extension. During reversed motion of wheels 6a and 6b, as when wheel 6a rises and wheel 6b descends relative to the aircraft, damping strut 20a shortens and strut 20b lengthens, each thereby absorbing energy by yieldingly resisting the reversed motion. Landing gear 16 can be simplified for very light aircraft by eliminating pivots 19, struts 20, lugs 21 and pivots 22, and employing interrupters 15 as shown in FIGURE 1 for these parts.

The significance of the motion-reversing feature is again to be observed. In FIGURE 2 if spring 17 were to be made in two pieces, each freely pivoted at pivot 9, the motion-reversing feature would be eliminated. Then the raising of wheel 6a would not cause a lowering of wheel 6b. A steadily applied ground pressure at one wheel could not distribute itself equally to both wheels and thus eliminate the rolling moment due to that ground pressure. That rolling moment would instead act steadily to roll the entire aircraft, an effect which is avoided under similar conditions by this invention.

Figure 3:
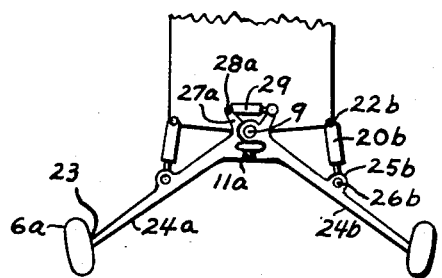

In FIGURE 3, landing gear 23 employs flexible cantilever legs 24 and combines features of landing gear 5 (from FIGURE 1) with those of landing gear 16 (from FIGURE 2). From the former, stops 11 are employed. From the latter, damping and interrupting struts 20 are used, mounting at their lower ends on lugs 25 rigidly attached on legs 24 and supporting pivot pin 26. At the upper ends of legs 24, extension arms 27 carry pivot points 28a and 28b, between which is mounted a conventional compression-type shock-absorbing elastic strut 29.

Figure 4:
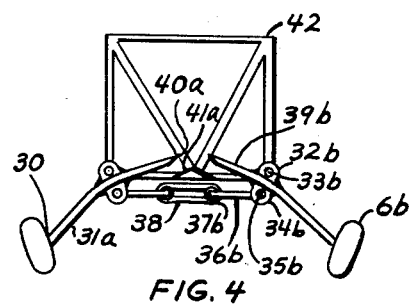
Figure 5:
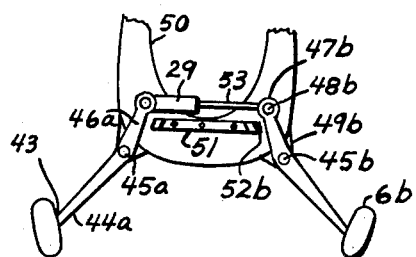

In FIGURES 4 and 5 the invention is shown as applied to cantilever landing gear legs at the lower longeron position of the fuselage instead of at the fuselage center plane. In FIGURE 4 landing gear 30 employs bent flexible cantilever leg 31. Above leg 31 and toward its mid-length point from its upper end is rigdly attached lug 32, pivoted by pin 33 to the rigid frame of the aircraft. Near this location lug 34 is rigidly attached beneath lug 32 and mounts pivot pin 35, to which is pivotally attached tension rod 36. At the inboard end of rod 36, this being the opposite end from pivot 35, is mounted spool fitting 37. Wrapped around spool fittings 37a and 37b and thereby interconnecting the two sides of the landing gear with a common spring action is shock cord spring member 38. Integral with the upper end of leg 31, above and inboard from lugs 32 and 34 is flexible extension 39 terminating in bearing pad 40. When either wheel 6 rises sufficiently, pad 40 is stopped by interrupter bearing pad 41 attached rigidly on fuselage frame 42. In the opposite direction, when both wheels descend, spools 37a and 37b come into contact and serve as stops having the same function as stops 11.

In FIGURE 5 landing gear 43 is mounted on a four-bar linkage, one bar of which is of elastically varying length, as is also the case in FIGURE 4 just described. In FIGURE 5, however, a compression member suitable for mounting internally in the fuselage is used instead of a tension member. Flexible cantilever gear leg 44 mounts to the rigid structure of the aircraft at pivot 45. Extension arm 46, integral with leg 44, carries lug 47 at its upper end, through which passes pivot pin 48. Fitting 49 is mounted on fuselage bulkhead 50 at the lower longeron position, carrying pivot pin 45. Interrupter member 51 is mounted rigidly to bulkhead 50 between landing gear leg upper extension arms 46. Interrupters 52a and 52b are located at the outboard ends of 51 and limit the inboard motion of extension arms 46. Between the upper extremities of arms 46, between pivots 48a and 48b, is conventional compression strut shock absorber 29, suitably lengthened by extension rod 53 to conform to the geometry of the linkage.

The operations of the landing gears in FIGURES 3, 4, and 5 are apparent by comparison with the descriptions of the actions of the landing gears in FIGURES 1 and 2.

In FIGURES 6 and 7 air-check strut 20 is shown, to clarify its functions: (a) damping the reversed motions of the landing gear legs relative to the aircraft, (b) interrupting the upward motion of the landing gear leg toward the aircraft [when the strut is compressed], and (c) stopping the downward motion of the leg away from the aircraft [when the strut is extended]. FIGURE 6 shows the strut compressed, serving as interrupter, with piston 56 in engagement with bearing pad 61. FIGURE 7 shows the strut extended with piston 56 stopped by downstop 60. In moving from the position of FIGURE 7 to the position of FIGURE 6, internally trapped air passes from one side of piston 56 to the opposite side through a minute orifice 62 and by leakage around the piston, and some escapes by leakage through downstop 60 around shank 57, yieldingly resisting the motion and absorbing energy. Lug 54 containing hole 55 and terminal fitting 58 containing hole 59 are for the purpose of attachment on landing gears 16 and 23 (FIGURES 2 and 3) as previously described.

FIGURES 8 and 9 illustrate the landing gear action. In FIGURES 8a through 8d operations occur on level ground in the absence of wind, or under conditions in which slope and wind exactly neutralize each other. In FIGURES 9a through 9d these conditions do not neutralize. There is a relative angle between the aircraft and the landing surface; either the terrain slopes down to the right or the wind blows from the left. Proceeding from the top of the page downwardly the figures represent landings. In the reverse order they represent take-offs.

Aircraft 1, which may be either a ground run or vertically-rising type, has body 2, aerodynamic lifting surfaces 3, and aerodynamic control surfaces 4. The views are shown in section as though cut transversely through aircraft 1 with the landing contact points located side-to-side from each other, but are intended to be applicable also to landing contact points located fore and aft from each other, or in other intermediate relationships, with the total number of contact points not limited to two.

Figure 8A:
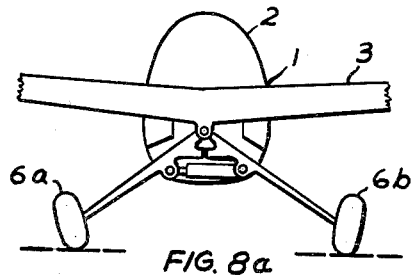
Figure 9A:
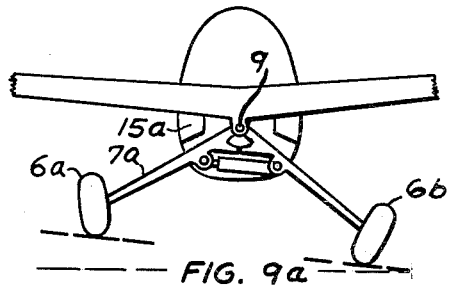
Figure 8B:
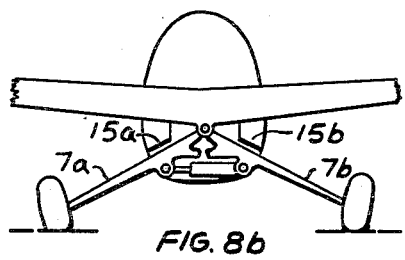
Figure 9B:
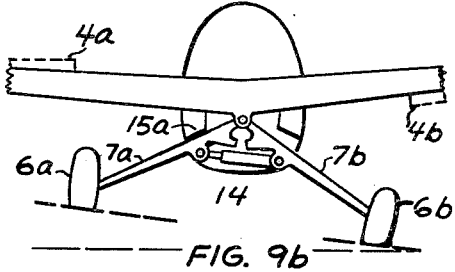

In FIGURES 8a, 8b, and 9a the aircraft is free to bank in response to its aerodynamic controls and the landing gear is in the softer portion of its stroke. In FIGURES 8c, 8d, 9c, and 9d, the aircraft is forced by its landing gear to a position substantially parallel to the ground line on which the wheels rest and the gear is in the stiffer portion of its stroke. In FIGURE 9b an intermediate situation exists; one side has shortened to the stiffer portion of its stroke while the other side is still in the softer portion of its stroke, so that the action to level the plane relative to the runway has commenced.

FIGURE 8a shows the symmetrical position of light contact pressure and FIGURE 9a is the corresponding unsymmetrical light contact position. In changing from the position of FIGURE 8a to that of FIGURE 9a in the process of making an eccentric landing, the increased pressure of wheel 6a on the ground produces a small reaction force which rotates the landing gear around pivot 9 but does not rotate the aircraft. Then, both wheel 6a and wheel 6b press against the ground with equal force, and the tires being deformable, both are flattened equally at the bottom. In this way an upward force at one wheel during fast taxying produces much the same effect as half that force at both wheels. (In other versions of the landing gear which employ frictional damping between the aircraft and the gear in this motion, as in gear 16 FIGURE 2, energy is absorbed and a moment is applied briefly to the aircraft but it does not persist nor greatly affect the angle of bank of the aircraft as compared to the continuous influences of the spring moments on conventional landing gears or moments due to ailerons 4.) No large impulse may be exerted vertically upward against wheel 6a until wheel 6b is stopped in its downward motion by reaching the ground, or until leg 7a rises against interrupter 15a. When wheel 6b reaches the ground, appreciable impulses may be applied, but they must be applied equally to both wheels 6a and 6b (so long as legs 7 have not been interrupted by interrupters 15) because the reaction force on each wheel is balanced by the tension in strut 14, which acts equally against the two legs. Similarly in all forms of the invention, except for brief effects of relatively small importance to control, such as forces due to friction, fluid movements causing pressure drops, compression of preloaded springs and centering springs, the resultant of the ground reactions on wheels 6a and 6b remains concentric with the aircraft.

The actions of FIGURES 8a and 9a are like having a single landing wheel located directly beneath the aircraft center of gravity; ground reaction forces are transmitted but moments can not be transmitted; the landing gear contributes no pitching or rolling stability. Only after the free-rocking action ceases does the single-wheel analogy disappear.

The mass of the aircraft is not appreciably accelerated in rotation when taking the eccentric position in FIGURE 9a. Consequently no ground reactions either to start or stop such an acceleration, such as commonly occur on conventional landing gears, can occur. Gear reactions with the ground are correspondingly reduced on this landing gear. The eventual acceleration of the aircraft to its tilted position of FIGURE 9d occurs over a relatively long period of time, so that the forces accompanying the starting and stopping of this motion are small from a structural design standpoint, and these small forces occur at a time when other loads on the landing gear are relatively small.

As soon as leg 7a encounters interrupter 15a, as shown in FIGURE 9b, the spring action of the left side of the gear becomes stiffer, since only leg 7a serves as a spring. The right side of the gear is as soft as before; it employs the total springing action of strut 14 and leg 7b. But when both legs are against their respective interrupters as in FIGURES 8c and 9c, both legs operate as stiff springs. Landing stresses then pass through interrupter bearing pads 15 which are suitably designed and attached to the aircraft to carry such loads.

Figure 8C:
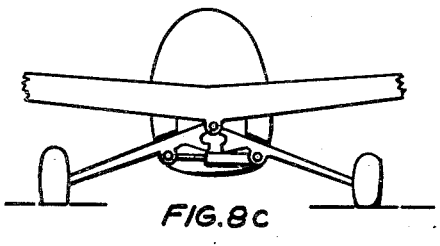
Figure 9C:
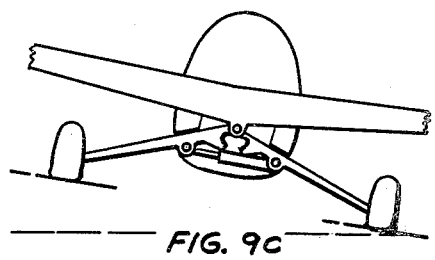

In FIGURES 8a and 9a there is insufficient ground pressure to prevent lateral skidding by means of friction between the wheels and the ground. In FIGURES 8b and 9b there is a moderate steady ground reaction, ordinarily sufficient to prevent skidding, and the lateral rocking freedom of the aircraft on its gear is partially curtailed. In FIGURES 8c and 9c there is ample ground reaction to prevent skidding, and the lateral rocking freedom is no longer present. In effect the landing gear weighs the plane's effective average reaction on the ground and permits the lift resultant to be tilted aerodynamically away from the vertical to produce a compensating horizontal component of force whenever there is insufficient reliable weight on the wheels to produce effective anti-skidding forces.

Figure 8D:
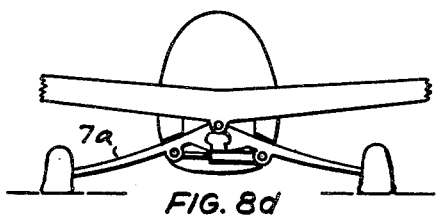
Figure 9D:
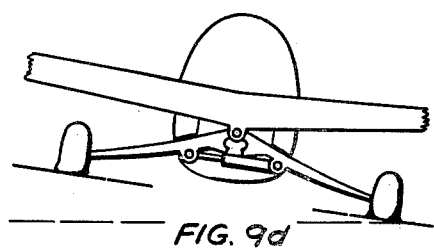

In FIGURES 8c and 9c the gear legs are against their interrupters; the gear is in the stiffer portion of its stroke. These figures correspond to the 1.0 g static weight condition of the aircraft; the aircraft is firmly on the ground and stiffly sprung against lateral rocking, but only a moderate amount of weight need be removed from the landing gear by aerodynamic lift to start the free rocking action. In FIGURES 8d and 9d the landing gear is compressed to its extreme limit, aligning the aircraft most stiffly with the ground surface. These figures correspond to overloads and illustrate the elastic bending of struts 7.

FIGURES 8 and 9 also illustrate the rough field action of the landing gear. When the aircraft is nearly airborne the landing gear may take the position shown in FIGURE 9a, and then reverse that position so that the right leg is shortened and the left leg is lengthened, without any appreciable lateral rocking disturbance being transmitted to the aircraft. A similar result is obtainable with wheels located fore and aft, so that neither rolling nor pitching motions need be transmitted to the aircraft in the fast taxying condition, but instead the ailerons and elevators become free to control the aircraft in these motions. By contrast, with a conventional landing gear, any displacement of one wheel relative to another wheel produces a moment acting on the aircraft which instantaneously and unavoidably produces an angular acceleration of the entire aircraft.

In FIGURE 9b, with a conventional gear, if wheel 6a were to rise to the position shown it would have to be forced upwardly against nearly the full stroke of its springing system, producing a large ground pressure at 6a without causing any increase in ground pressure at wheel 6b. To balance the rolling moment which these wheel reactions would apply to the airplane, ailerons 4a and 4b would have to occupy deflected positions as shown in dotted lines, merely to maintain static trim. Depending upon the design quantities and the dynamics involved the ailerons might or might not be able to produce rolling trim. In any case their ability to control the aircraft in roll beyond the trim point would be decreased directly by the amount of the rolling moment produced in springing the landing gear laterally. With this invention, no such weakening of aileron control occurs. Until leg 7a actually touches interrupter 15a the ailerons may remain in neutral, available for full throw and full control in either direction.

It is apparent that innumerable arrangements of landing gears may be designed incorporating this invention, and that the various elements of springing systems, motion-reversing mechanisms, interrupters, dampers and so on, may be combined advantageously in numerous ways according to design requirements. Without attempting to show all the details which would be employed in a final design, several basic types of construction are shown in FIGURES 10 through 20. The operations of these gears will be readily understood by comparison with the versions already described.

In FIGURE 10, landing gear 63 employs flexible leg 64 rigidly attached to circular-sectioned torque rod 65 which is aligned in a fore and aft direction and rotates freely in pivot bearings 66, which are mounted rigidly on fuselage frames 50. Lever arm 67 is rigidly attached to torque rod 65 at the opposite end of 65 from gear leg 64. At the upper end of lever 67 is pivot 68. Linkage rod 69 connects pivot 68a and pivot 68b, completing a flexible motion-reversing interconnect system between wheels 6a and 6b. Arm 70 extends the upper end of gear leg 64 above its pivot line and terminates in bearing pad 71, which engages interrupter 72 mounted rigidly on bulkhead 50 when wheel 6 rises sufficiently toward fuselage 2. When wheel 6 drops away from fuselage 2 sufficiently the opposite side of pad 71 engages stop 73, which is also rigidly attached to bulkhead 50, thereby permitting any desired amount of torsional pre-load to be put in torsion rod 65.

In FIGURE 11, leaf spring struts 75 slope forwardly and downwardly from the lower side of wing 3 to wheels 6 and axles 8, forming the ground contacting leg and foot members of landing gear 74. The upper ends of struts 75 attach rigidly to torque rod spring members 76a and 76b, which form the cross bar of a T with centering spring torque rod 81. At the intersection of the T, cone gear 80 is rigidly attached to torque rod 81 and meshes with cone gears 79a and 79b which are rigidly attached to torque rods 76a and 76b respectively. The opposite end of torque rod 81 is rigidly attached to fitting 82 which is rigidly mounted on wing 3. Torque rods 76 mount free to rotate in bearings 77 and 78 aligned along their axes. Mechanical interrupters 83 mount rigidly to wing 3 in positions to bear against leaf springs 75 to interrupt the upward motions of those parts at the points of contact as springs 75 rotate upwardly partially by flexure and partially by rotation around the axis of torque rods 76. Excessive downward motion of wheel 6 is stopped by stop bar 84 affixed to outboard bearings 78 engaging extension 85 at the upper end of spring strut 75.

In FIGURES 12 through 15 a pneumatic version of the invention is shown on a vertically rising aircraft using large landing blisters instead of wheels to serve the functions of ground contacting leg and foot members. FIGURES 13, 14, and 15 in sequence show the landing operation; FIGURE 13 is before contact, FIGURE 14 is at the limit of free lateral rocking before any substantial ground reaction has occurred, and FIGURE 15 is with the weight of the aircraft fully settled on the landing feet. The reverse sequence of figures represents take-off.

In FIGURE 12, vertically rising aircraft 1 having aerodynamic lifting surfaces 3 and body 2 is descending toward a laterally sloping surface where it will rest on landing gear 86, on deformable ground contact feet 87a, 87b, 87a', and 87b'. (These foot members are similar to tires in that they are pad-like members which flatten under ground pressure to provide bearing area to prevent excessive penetration of the surface of the ground, having a relatively soft contacting surface which deforms and obscures the effects of small ground-surface irregularities, such as pebbles. The landing gear leg members are distinguished from the feet by the fact that they do not contact the ground, they lack the soft deformable ground-contacting features and they have a resiliently displaceable stroke in the vertical component of direction which is large compared to that which occurs merely due to the flattening of a foot member or a tire member.) These four resilient feet form the corners of an imaginary substantially horizontal quadrilateral surface, vertically above the central point of which the center of gravity of aircraft 1 is located. Feet 87a' and 87b' are not shown. These parts lie behind feet 87a and 87b respectively and resemble in all respects these more forward parts. As shown in FIGURE 13, foot 87a is mounted on the lower surface of rigid plate 88a above which is flexible pleated air bag 89a having circular sections in horizontal planes. The top of bag 89a mounts on transverse interrupter beam 90, which contains a hole entering into the space contained within bag 89a admitting interconnecting air passage tube 91a, which tube runs inboard to air reservoir 92. Out of reservoir 92 run tubes 91b, 91a' and 91b', freely interconnecting reservoir 92, tube 91a, bag 89a and other parts designated "a" with corresponding parts designated "b," "a'," and "b'," respectively. The entire internal volume contained by and interconnected among the parts just described is sealed against air leakage, and serves as a spring in a motion-reversing mechanism. The trapped air is at atmospheric pressure in the freely-hanging no-load condition. Within bag 89 is located flexible pleated air bag 93, each horizontal cross section of which is circular. At the top of bag 93, closing and sealing its top end is rigid interrupter bearing pad 94. The bottom of bag 93 is mounted on and sealed to rigid plate 88. Joining plates 88 and 94 through the interior of bag 93 is flexible cable 95. It is attached to both plates, thereby preventing elongation of bag 93 beyond the length of cable 95 but not preventing shortening of bag 93. Bag 93 carries an internal pressure greater than bag 89. Air inflation line 96 passes through plate 88 and runs aft between that plate and sole 87 to a point accessible for servicing. Surrounding plate 88 and bags 93 and 89 is telescoping aerodynamic fairing 97. Parts 91 and 92 and the air within them and within bags 89 comprise the motion-reversing mechanism. The air in these parts functions as the spring in this mechanism. Parts 88, 89, 90 (locally), 93, 94, 96, and 97 comprise the landing gear leg. Parts 90 (locally), 93, 94, and 95 in combination comprise the interrupting means, which puts the motion-reversing mechanism out of action. The damping of the motion-reversing mechanism is provided by frictional resistance to air movement through tubes 91.

FIGURE 13 shows the no-load free-hanging positions of these parts. Bags 89 are free to extend and shorten in mutual compensation as air is displaced through tubes 91. When one landing point makes initial contact with the ground it shortens and the other three landing points extend toward the ground. As each makes contact the extension of the non-contacting points is hastened. When all have made contact or have extended so far as to encounter mechanical stops, the common pressure in bags 89, interconnect tubes 91 and reservoir 92 commences to increase. Free rocking of the aircraft by means of its aerodynamic controls relative to its landing gear is permitted until one of the interrupter plates 94 rises to interrupter beam 90, closing and sealing the outlet of tube 91 where it enters bag 89, preventing any further escape of air from bag 89 and requiring that both the remaining air in bag 89 and the air in bag 93 be compressed if a further shortening of this particular ground contact pad is to occur. Some such shortening may yet be imposed by moments produced aerodynamically, but only relatively small additional angles of aircraft displacement may be achieved by substantial aerodynamic moments, in the manner of a conventional landing gear, whereas when there is free space throughout between beam 90 and plates 94 an angle of rocking displacement may be achieved without the application of any significant aerodynamic moment.

FIGURE 14 shows the maximum angle of free lateral displacement at light contact with the laterally sloping terrain. Interrupter plate 94b is closing the outlet of tube 91b. The air trapped between bag 89b and bag 93b is not compressed. Bag 93b will not shorten until its initial internal pressure has been exceeded, at which time the tension disappears from cable 95b. As more weight settles on soles 87, the relatively large volume of air in bag 89a, interconnects 91, and reservoir 92 becomes compressed. When this air is compressed sufficiently to allow interrupter plate 94a to bear up against interrupter beam 90 and seal the outlet of tube 91a, the pressure in the air trapped between bag 89a and 93a is appreciably greater than was the pressure in the air correspondingly trapped between bag 89b and bag 93b at the instant when free-rocking ceased, as described above. Thus, when the aircraft settles first on one pad in accommodating itself to terrain, that first pad contains a relatively smaller mass of air than the pads which shorten later, with the result that the aircraft when fully settled on the ground retains an attitude closer to its free flight attitude than it would otherwise take. This is of significance on steep slopes; a sloping attitude on the ground causes the downslope feet to carry greater ground reaction forces than the upslope feet, so that if all feet were of equal resilience and equal free length the aircraft would tilt more steeply than the hillside. By the means just described this situation is alleviated. See FIGURE 15. Also dimished are the gyroscopic reactions which occur, on aircraft having large lifting rotor systems, as the aircraft inclines in settling onto its landing gear.

In FIGURES 16 and 17 shock absorbing struts are shown which are employed in landing gear 98, shown in FIGURE 18. The struts are shown in FIGURE 16 in positions of equal loading, carrying the static weight of the aircraft. In FIGURE 17 the same parts are shown in a position approaching maximum unsymmetrical displacement under light loading. These struts may be incorporated in landing gear designs in various ways. In any complete landing gear there would be additional conventional details not shown here, such as suitable pressure holding packings and similar hydraulic features, pivots where the ends of the struts attach into a landing gear linkage, or fittings at the upper ends of the struts attaching to the aircraft structure, and some form of foot member such as a wheel at the lower end of each strut.

Inner cylinder 99 telescopes within outer cylinder 100. Internal to both is interrupter piston 101, having at its upper end piston head 102, which is circumferentially in contact with the inner bore of outer cylinder 100, and having at its lower end orifice plate 103, circumferentially in contact with the inner bore of inner cylinder 99, containing orifice 104 at its center, and having orifice support tube 105 containing orifices 106 rigidly joining 102 and 103. Metering pin 107, rigidly attached on partition 108 which lies internally across cylinder 99, interacts with orifice 104 as hydraulic fluid 109 passes through orifice 104 incident to relative axial motion between cylinder 99 and free piston 101, at which time fluid 109 also passes through orifices 106, absorbing energy in a conventional manner. Trapped air 110 lies between the upper surface of hydraulic fluid 109 and the lower surface of piston head 102. Above 102 and beneath the top of cylinder 100 lies hydraulic fluid 111. Trapped air 110 is admitted through air valve 112 and interconnecting air line 113. Interconnecting sealed passage tube 114 conveys fluid 111 freely between cylinder 100a and cylinder 100b, so as to exert pressure equally during static conditions on the upper surfaces of piston heads 102a and 102b. Fluid 111 may be drained through bleed fitting 115. Conventional torque arms 117 and 118 are pivoted at fitting 119 to cylinder 99 and at fitting 120 to cylinder 100, respectively, and are pivoted together at pin 121.

When cylinder 99 moves downward relative to cylinder 100, trapped air 110 expands. When its pressure would otherwise become less than the pressure in fluid 111, interrupter piston 101 starts to move downward and floats between air 110 and fluid 111, having axial motion relative to both cylinders 99 and 100. When piston 101a is floating freely in this manner the instantaneous spring rate of the strut is a function of the total quantity of the air 110a plus any air contained in passage 114 plus air 110b. This spring rate is adjustable by increasing or decreasing the volume of trapped air communicating with interconnect 114, using reservoirs to increase air volume where desirable. On the other hand, when piston 101a bears solidly against the top of cylinder 100a the spring rate of the strut is governed only by air 110, producing a stiffness exceeding that available at any other time, in that all elastic deflections in interconnect tube 114 including tube expansion under pressure are eliminated. Also when pistons 101a and 101b are both floating freely as when both struts carry light loads, no substantial restraint exists against deliberately shortening one strut and lengthening the other strut by equal amounts, by the action of transferring a volume of fluid 111 through interconnect tube 114 from one strut to the other.

FIGURE 16 shows both struts compressed, with interrupter pistons 101 bearing up against interrupter bearing pads 116, in which condition the struts operate conventionally and level the aircraft relative to the surface of the ground. FIGURE 17 shows the struts extended, with air 110 expanded, with pistons 101 free-floating, and hence with the struts themselves free-floating in differential extension. This is shown by piston 101b in the right hand strut being in a lower relative position than piston 101a in the left hand strut, with the right hand strut relatively extended. At this time there is no action from the landing gear to hold the aircraft level to the ground. These actions are illustrated for two struts; the same action applies for three or more struts, and they may be arranged into landing gears with the shock struts in a variety of positions and with landing legs separated either side-to-side or fore-and-aft.

As may be seen in FIGURE 17, there is no oil flow through orifice 104 in the freely-rocking portion of the stroke when the total weight resting on the landing gear is constant; at that time there is no relative motion between cylinder 99 and piston 101. Flow through orifice 104 occurs during free-rocking only to the extent that the total ground reaction force carried by the gear changes, changing the compression of trapped air 110 and causing relative motion between cylinder 99 and piston 101.

In FIGURES 18 through 20, hydraulically interconnected landing gear 98 is shown. The hydraulic shock absorber struts shown in FIGURES 16 and 17 are mounted to the aircraft structure by fittings 122, at three points grouped rather closely around the aircraft center of gravity. Adjacent to each strut in interconnect tube 114 is located coupling tube 123 and orifice plate 124, containing orifice 125. Interconnect tube 114 branches four ways from a common central point, branches 114a, 114b and 114c extending to the above-described shock absorber struts, and branch 114d extending to reservoir 92 containing trapped air 126. In tube 114d there is also an orifice plate 124 like those in the other three branches. Hydraulic fluid 111 is admitted to reservoir 92 through oil filler neck 128, and air 126 is admitted through air pressure valve 127. The landing gear is inflated at the struts at air valves 112 (see FIGURE 16) and at air valve 127 on reservoir 92.

To increase relatively the range of strut stroke through which the free-rocking action occurs a relatively greater pressure of air is applied through valve 127 at the reservoir. This, at any given strut extension with the pistons free, causes the pistons to descend relatively in the struts. For ordinary servicing the aircraft will be resting on its wheels and the free pistons will be at the tops of their strokes. Then the pressure in air 110 in the struts will exceed that in air 126 in the reservoir. By making this pressure difference small, the landing gear is adjusted to start rocking freely when only a small part of the weight is transferred to the aerodynamic lifting system; by making the pressure difference large the rocking freedom does not occur until a relatively large weight is lifted aerodynamically. The pressures at both the reservoir and at the struts may be increased to offset an overload condition. By selective inflation as described any one of a family of curves of static force versus stroke typical of the particular design may be utilized in practice, facilitating operations at off-design points. Also by design selection of reservoir volume almost any desired ratio of design extended pressure to design 1.0 g pressure may be obtained.

The action of hydraulic landing gear 98 is closely parallel to that of the mechanical landing gear, as illustrated in FIGURES 8 and 9. In the descriptions of that action if one replaces landing gear leg 7 and interrupter bearing pad 15 with their hydraulic equivalents, interrupter piston 101 and interrupter bearing pad 116 at the top of cylinder 100, the sense of the description is converted from the mechanical to the hydraulic. By the same analogy the bending flexibility of individual landing gear leg 7 corresponds to the compressibility of trapped air 110 in individual cylinder 100, and the spring within cylinder 14 acting in common on both legs 7a and 7b corresponds to the spring consisting of trapped air 126 in reservoir 92 acting in common on all hydraulic legs in FIGURE 18.

Orifice plates 124 provide a frictional damping action resisting any fast movement of any of the free pistons. This absorbs energy in hard landings, including eccentric landings, and delays the seating of the free pistons at the tops of the cylinders thereby prolonging the time during which free lateral rocking is available. By means of this damping the full stroke of each leg is available for energy absorption. This does not reduce the effectiveness of the free rocking action appreciably, because the time spans available to accomplish controlled changes of roll angle or pitch angle are very long as compared to the very brief shock loadings which occur in hard landings. The type of loading which produces critical stresses in the structure is of such short duration as to be of little significance in changing the attitude of the aircraft. It is not important from a control standpoint to eliminate this momentarily acting force, nor, for similar reasons, that due to pre-loaded compression of extended struts. On the other hand, it is important to eliminate all continuously applied moments due to undercarriage springing since these have time to achieve aircraft angular displacement, and therefore require the pilot to expend his aerodynamic controllability to oppose them. On all versions of the invention dampers are easily applied having actions equivalent to those shown in FIGURES 18 and 19, and are already indicated in some cases, as in FIGURE 3 which shows all the basic elements of the invention in active combination.

As shown in FIGURE 18, the use of a nose wheel shock strut interconnected to the main gear struts permits the pilot to pitch the aircraft freely when bearing lightly on the ground, enabling the elevator to be employed effectively while the aircraft is only partially airborne. The piloting responses are like those in flight. This action reduces the changes of control column force required to maintain trim during take-off and landing, and spreads out these changes over a longer period of time so that they are more gradual and therefore more agreeable. In take-off, the problem of unsticking the nose wheel is largely eliminated. The aircraft need only achieve enough lift to permit some free rocking. It may then be nosed up by elevator action to achieve more lift and more freedom in pitch, and so on until it attains an adequate angle of attack, with all wheels of the landing gear still bearing an appreciable portion of the plane's weight. In landing, after initial contact, the nose may be held high to reduce ground pressure as when landing on soft ground, or it may be held down to get rid of wing lift quickly for fully braked stopping, a need which is growing as landing speeds continue to increase and blind approaches and sudden break-outs over the ends of the runways become more commonplace. The conventional tricycle landing gear, of course, may permit a landing plane to nose down to reduce aerodynamic lift quickly, but the greater its suitability in this respect the greater also is the difficulty in raising the nose wheel on take-off. The present invention relieves these design limitations of the conventional tricycle landing gear.

The landing gear shown in FIGURE 18 is short coupled fore and aft. There are practical advantages in short coupling. The nose wheel bears steadily against the ground for effective steering. A large angle of pitch accompanies each unit of strut movement. The design landing load on the nose wheel may be made equal to those on the main gear legs, and identical struts may be used at all three points. With such a gear there is no need to raise the nose wheel clear of the ground short of complete take-off. All pitching of the aircraft when the wheels are in contact with the ground is by means of the free rocking feature of the landing gear.

Although all the figures show non-retractable landing gears it is apparent that the same features may be incorporated in retractable designs. In design, the benefits of the invention may be obtained in many cases by very simple modifications of existing designs. Since all landing gears which have springing permit some degree of forced rocking, it is not necessary ordinarily to employ angles of free rocking as large as those illustrated in the figures. Major improvements in ground-borne control may be achieved with as little as 4 degrees of completely free rocking added to that already available through forced rocking, with the four degrees measured from the neutral level position.

The above-described results are achieved for both vertically rising and runway aircraft by the combination of certain basic elements of construction, (A) through (D) below, in addition to well-known elements of conventional landing gear design:

Element (A): An aircraft having aerodynamic controls producing rotational changes of aircraft attitude, thereby controlling the direction of the lift resultant to control horizontal motions. For example (a) ailerons bank an airplane and incline the lift force to accelerate the airplane laterally, and (b) on a vertically rising aircraft having a horizontal fuselage attitude a pitching control system is commonly employed to tilt the powered thrust fore and aft to accelerate the aircraft fore and aft. For example, in FIGURES 1 and 9b, ailerons 4a and 4b, conventionally operated, are attitude controlling means.

Element (B): Two or more individually sprung landing gear legs with resilient ground contacting foot members on the aircraft separated horizontally, each resisting the ground reaction and moving vertically relative to the aircraft in a conventional energy absorbing manner. For example, in FIGURE 18 see cylinders 99 and 100 which comprise the leg, and wheel 6 which is the foot.

Element (C): A motion-reversing mechanism interconnecting the ground contact points of element (B) as for example a closed passage transmitting air or hydraulic fluid from one telescoping strut to another, or a mechanical linkage joining the lower ends of a pair of telescoping struts, or a torque rod or cable system producing equivalent results, or a simple mechanical lever pivoted at its midpoint with a landing wheel at each extremity. Whatever the means employed, the action when freely displaceable is that of motion-reversing, which means that an upward component of movement of one ground contact point relative to the aircraft is accompanied by a downward component of movement of one or more other ground contact points, and relatively little force is required to produce these movements when they are at a slow velocity. By this action the aircraft is permitted to rock and pitch relative to the ground plane. Each motion-reversing mechanism is also some form of spring acting in common on all leg members which permits all landing contact feet to move upwardly or downwardly together, relative to the aircraft, when sufficient forces are applied to all contact points, and it usually includes energy absorbing damping means. The spring system actuates element (D) below. For example, free pistons 101, cylinders 100, interconnect tubes 114 and fluid 111 comprise a motion-reversing mechanism. Air 126 in reservoir 92 is the common spring in this system displacing all leg members away from the aircraft and orifice plate 124 with orifice 125 (in tube 115) comprise the damping means attached to the aircraft between the aircraft and the motion-reversing mechanism.

Element (D): Interrupting means for putting the motion-reversing action of interconnecting means (C) relatively in and out of action as a function of the force acting on the landing points and the displacement of those points, and for accomplishing this in a smoothly progressive manner. When any of the landing points (B) is displaced upwardly to a predetermined position relative to the aircraft (A), means (D) comes into action to isolate this landing point from further influence from the motion-reversing system (C). Thereafter, the landing point acts predominately in its individual capacity and experiences no motions except those which are impressed locally, substantially independent of the motions of and the forces acting upon any other landing contact point, in the manner of a conventional landing gear. For example, free piston 101 which rises against interrupter bearing pad 116 (FIGURE 16) illustrates the interrupting means.

In piloting aircraft employing this invention, no special familiarization is required. Whenever the airplane is rolling heavily the pilot uses his rudder pedals, power and brakes in a conventional manner. Whenever the airplane responds to its aerodynamic controls the pilot employs them conventionally, adjusting his lateral position relative to the runway by the use of ailerons and holding his heading by the use of rudder. Control of the aircraft by the forces of ground friction and air pressures overlap without interference during that time during take-off and landing when the aircraft is partially a land vehicle and partially a ground vehicle. Previously, aircraft passed through this uncertain time safely only on straight runways and in the absence of any appreciable cross wind. With ever-increasing landing speeds it becomes almost essential to give the aircraft on its landing gear the freedoms which will allow it to respond to its flight controls. At high speed an aircraft is much more secure in its element as an air vehicle than as a ground vehicle, and it should not be forced to be a ground vehicle unless it has slowed down to a rolling speed appropriate to a ground vehicle.

I claim:

1. On an aircraft, a landing gear comprising two or more leg members extending beneath said aircraft, resilient foot members attached at the lower extremities of said leg members, said foot members being displaceable vertically relative to said aircraft, bearing pad interrupting means between each of said leg members and said aircraft interrupting the upward travel of said foot members in upward positions predetermined relative to said aircraft, a common spring member connectedly interposed between said leg members, an individual spring member interposed locally between the aircraft and each individual foot member, said spring members constraining said foot member against upward motion relative to said aircraft, said interrupting means stopping the resilient deflection of said common spring member at said predetermined upward position of said leg member, and said individual spring members remaining resilient at said predetermined upward positions of said leg members.

2. On an aircraft, a landing gear comprising an elastic motion-reversing mechanism attached to said aircraft, at least two leg members attached to said motion-reversing mechanism, each of said leg members individually including elastic stroke means, resilient foot members attached at the lower extremities of said leg members, the vertical components of motion of said foot members being reversed by said mutually attached mechanism and leg members in combination, said elastic means co-operating to displace said foot members downwardly away from said aircraft and ground pressure displacing said foot members toward said aircraft against the combined resistance of said elastic means, and bearing pad interrupter members attached to said aircraft between said aircraft and said leg members engaging said leg members at predetermined positions relative to said aircraft, said interrupter members thereby rendering said leg members substantially motionless relative to said aircraft at the points of engagement with said interrupter members, said leg members being resiliently displaceable relative to said aircraft at points other than said points of engagement with said interrupter members.

3. On an aircraft, a landing gear comprising individually resilient leg members beneath said aircraft, an elastic motion-reversing mechanism between at least two of said leg members displacing at least one of said leg members downwardly relative to said aircraft when one of said leg members moves upwardly relative to said aircraft, resilient foot members at the lower extremities of said leg members for contact with the ground, whereby the motions of said foot members are reversed relative to each other so that each foot member at that time occupies an indefinite position relative to said aircraft, and bearing pad interrupting means between said aircraft and said leg members engaging said leg members and thereby constraining the engaged portions of said leg members to predetermined positions relative to said aircraft, each of said foot members then occupying a position relative to said aircraft locally resilient by means of the individual resilience of said leg member.

4. On an aircraft, a landing gear comprising two or more individually resilient leg members vertically displaceable relative to said aircraft, elastic motion-reversing means attached to said aircraft and attached to said leg members, said motion-reversing means reversing the motion of displacement of one of said leg members relative to another of said leg members, elastic means in said elastic motion-reversing means displacing said leg members in common away from said aircraft, resilient foot members attached at the lower extremities of said leg members for contacting the ground, and bearing pad interruption means attached to said aircraft locally engaging said leg members, said interruption means flexibly constraining said leg members to predetermined positions relative to said aircraft.

5. In an aircraft landing gear, at least two flexible landing gear members substantially separated horizontally on opposite sides of the aircraft center of gravity, resilient foot members attached at the lower extremities of said leg members, a single spring member displacing said leg members simultaneously in a direction to carry said foot members downwardly away from said aircraft, and bearing pad interruption means attached to said aircraft locally at each leg member engaging each leg member at a predetermined position relative to said aircraft and flexibly resisting the upward motion of each foot member relative to said aircraft.

6. In an aircraft, a landing gear comprising a motion-reversing mechanism attached to said aircraft, two or more resilient leg members beneath said aircraft attached to said motion-reversing mechanism and having their vertical components of motion reversed thereby, resilient foot members attached at the lower extremities of said leg members, spring means attached to said motion-reversing mechanism displacing said attached leg members in directions to displace said foot members simultaneously downwardly away from said aircraft, stopping means attached to and interposed between said leg members stopping such simultaneous downward displacement of said foot members, and bearing pad interrupting means attached to said aircraft interposed between said aircraft and said leg member engaging said leg member in a predetermined position relative to said aircraft flexibly interrupting the upward displacement of said foot member toward said aircraft.

References Cited in the file of this patent
UNITED STATES PATENTS

| | | |
|---|---|---|
| 1,685,119 | Carns | Sept. 25, 1928 |
| 1,988,093 | Steward | Jan. 15, 1935 |
| 2,597,265 | Salter | May 20, 1952 |
| 2,927,747 | Bennie | Mar. 8, 1960 |
| 2,933,271 | Maltby | Apr. 19, 1960 |

FOREIGN PATENTS

| | | |
|---|---|---|
| 819,026 | France | June 28, 1937 |